United States Patent [19]

Pittalis et al.

[11] Patent Number: 4,879,036
[45] Date of Patent: Nov. 7, 1989

[54] ASYMMETRICAL MEMBRANE OF POLYESTER-AMIDE AND PROCESS FOR PREPARING IT

[75] Inventors: Francesco Pittalis; Francesco Bartoli; Otello Farias, all of Rome, Italy

[73] Assignee: Eniricerche, S.p.A., Milan, Italy

[21] Appl. No.: 60,120

[22] Filed: Jun. 9, 1987

[30] Foreign Application Priority Data

Jun. 20, 1986 [IT] Italy .............................. 20862 A/86

[51] Int. Cl.$^4$ .......................... B01D 13/00; C08J 9/28
[52] U.S. Cl. .................................. 210/500.38; 264/41; 264/331.19
[58] Field of Search ............................ 264/41, 331.19; 210/500.38

[56] References Cited

U.S. PATENT DOCUMENTS

| 3,962,158 | 6/1976 | Mima et al. ................. | 210/500 M |
| 4,460,526 | 7/1984 | Makino et al. ................. | 264/41 |
| 4,673,418 | 6/1987 | Peinemann ................. | 264/41 X |

FOREIGN PATENT DOCUMENTS

| 2314215 | 1/1977 | France . |
| 908844 | 2/1972 | Italy . |
| 1503270 | 3/1978 | United Kingdom . |

*Primary Examiner*—Philip Anderson
*Attorney, Agent, or Firm*—Hedman, Gibson, Costigan & Hoare

[57] ABSTRACT

An asymmetrical membrane for use in dialysis and ultrafiltration is prepared using a polyester-amide (TATE)$_n$, wherein T represents a radical of terephthalic acid, A represents a radical of hexamethylenediamine, and E represents a radical of hexanediol, in a solvent of formic acid or in a solvent comprising a solution of lithium chloride in dimethylformamide or dimethylacetamide. The polyester-amide (TATE)$_n$ is formed into a thin layer and placed into an aqueous coagulation bath to coagulate the resulting membrane. The membrane has a thickness of from 15 to 190 μm, a water permeability of from about 3 up to about 9 liters/m$^2$/hour for a ΔP of 300 mm$_{HG}$ and is permeable for substances having a molecular weight of up to about 17,000.

15 Claims, 1 Drawing Sheet

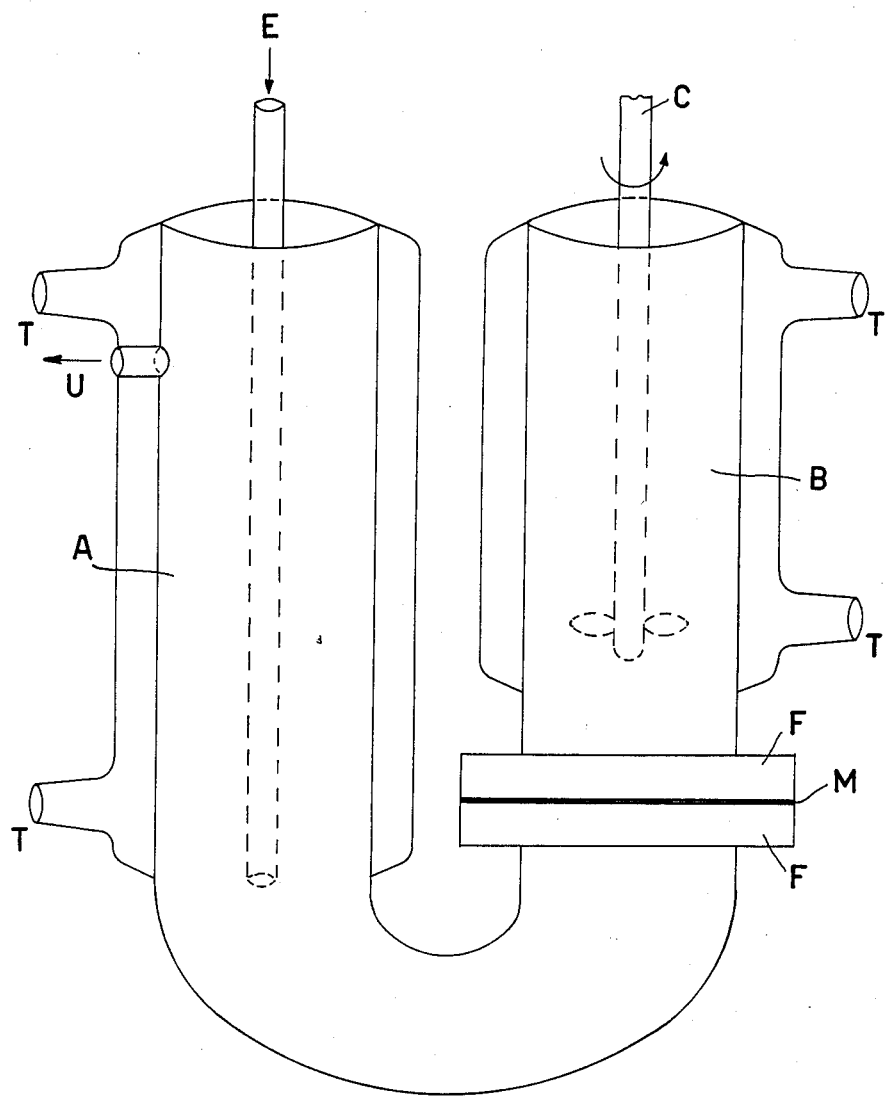

ASYMMETRICAL MEMBRANE OF POLYESTER-AMIDE AND PROCESS FOR PREPARING IT

The present invention relates to an asymmetrical membrane of polyester-amide and to the process for preparing it.

In the art asymmetrical membranes are known, which are used in dialysis and ultrafiltration processes, and are obtained by starting fro msuch sysnthetic polymers as polyvinyl alcohol and acrylic polymers, or from regenerated cellulose or from cellulose derivatives, such as disclosed, e.g., in French Pat. No. 2,314,215, and U.S. Pat. No. 3,962,158.

In case of syntheic polymers, difficulties exist in controlling the dimensions and the distribution of the pores of the membrane, and sometimes problelms exist of hemocompatibility; such reasons have limited, to datae, the commercial applications of these membranes, in particular in the hemodialysis field.

On the other hand, the asymmetrical membranes obtained from cellulose derivatives display a good permeability for the substances having a relatively low molecular weight, but not completely satisfactory permeability values for the substances having an average or relatively high molecular weight, and this constitutes a drawback in particular in the application in hemodialaysis processes.

It has been found now that it is possible to obtain an asymmetrical membrane endowed with good characteristics of permeability for substances having a molecular weight comprised within a wide range of values, by means of a simple and convenient process, which uses a particular polyester-amide as the starting material.

Said asymmetrical membrane has furthermore a controlled distribution of the pores, it is mechanically strong, and does not give rise to hemocompatibility problems, thus overcoming, or at least greatly reducing, the problelms involved by the asymmetrical membranes of the known art.

Accordingly, the present invention relates to an asymmetrical membrane of polyester-amide, useful in the processes of dialysis and in general in the ultrafiltration processes, formed by a polyester-amide with repetitive unit $(TATE)_n$ (wherein T is the radical of terephthalic acid; A is the radical of hexamethylenediamine; and E is the radical of hexanediol), said asymmetrical membrane having a thickness of from 15 to 190 μm, a water permeability value of up to 9 liters/m²/hour, for a $\Delta P$ of 300 $mm_{Hg}$ and being endowed with a good permeability for substances having a molecular weight of up to about 17,000.

According to another aspect thereof, the present invention relates to the process for preparing said asymmetrical membrane, said process comprising the following steps, carried out sequentially:

preparation of a solution of polyester-amide $(TATE)_n$ in solvent constituted by formic acid at a concentration higher than about 99%, or constituted by a solution of lithium chloride in dimethylformamide or dimethylacetamide;

spreading of the polyester-amide solution on a flat support, to a layer having a thickness of from about 20 to about 200 μm;

dipping of the coated support in an aqueous coagulation bath;

washing with water and recovery of the so-obtained asymmetrical membrane.

By polyester-amide, according to the present invention, a copolymer is meant which comprises the repetitive unit $(TATE)_n$, wherein:

T represents the radicacl of terephthalic acid;

A represents the radical of hexamethethylenediamine; and

E represents the radical of hexanediol.

As regards the preparation and the general characteristics of such a polyester-amide, reference is made to Italian Pat. Nos. 908,843 and No. 908,844.

To the purposes of the present invention, also those polyester-amides are useful, which have the above-indicated repetitive unit, and which are endowed with the following characteristics:

relative viscosity: from 2 to 2.5 (measured at 25° C., with 1% by weight of polymer in a 1:1 by volume phenoltetrachloroethane solvent mixture);

content of free carboxy groups: from 15 to 25 meq/kg;

melting point: from 252° to 260° C.

To the purposes of the present invention, the polyester-amides are preferred, which have the following characteristics:

relative viscosity: about 2.3;

content of free carboxy groups: about 22 meq/kg;

melting point: about 255° C.

According to the process of the present invention, a solution is prepared of the polyester-amide in a solvent selected from:

formic acid at a concentration higher than about 99%;

dimethylformamide containing dissolved lithium chloride;

dimethylacetamide containing dissolved litthium chloride.

In particular, by means of the solvent consisting of formic acid at a concentration higher than 99%, preparing is possible solutions containing up to about 35 parts by weight of polyester-amide, per each 100 part by weight of solvent, by operating at temperatures of up to about 100° C.

In case of the other above-mentioned solvents, the amount of dissolved lithium chloride is normally ranging from 2 to 7 parts by weight per each 100 parts by weight of dimethylformaide or of dimethylacetamide.

In the typical case of a solvent containing from 4 to 6 parts by weight of dimethylformamide or of dimethylacetamide, preparing is possible solutions containing up to about 35 parts by weight of polyesteramide per each 100 parts by weight of the same solvent, by operating at a temperature of up to about 100° C.

In the preferred form of practical embodiment of the present invention, as the solvent for the polyester-amide a solution is used of from 4 to 6 parts by weight of lithium chloride per each 100 parts by weight of dimethylacetamide, or formic acid at a concentration higher than about 99% is used, and in such solvents the polyester-amide is dissolved in an amount of from 15 to 35 parts by weight per each 100 parts by weight of the same solvent, by operating at a temperature of the order of 100° C.

The so-obtained solution is filtered at the same temperature, and is then spread on a flat surface.

For the spreading step, any equipment can be used, which allows a layer of polymer solution to be spreadd on a flat support, e.g., a glass sheet, such as a spreading device equipped with a doctor blade with micrometric adjustment.

The temperature of the solution being spread is conveniently maintained at values of from 80° to 100° C., and however at a temperature higher than that which makes polymer precipitate.

The spreading operation can be obviously performed on supports of different sizes, as a function of the size of the desired membranes, and it can be furthermore carried out either as a batchwise or as a continuous process.

In any case, immediately after the spreading, the coated support is dipped into an aqueous coagulation bath, at room temperature (20°-25° C.), or at temperatures close to room temperature.

The coagulation time, under the above indicated conditions, may range from 1 to 10 minutes, and is preferably of the order of 3-5 minutes.

At coagulation end, the membrane is mechanically separated from the support, and is thoroughly washed with running water, e.g., for 24 hours.

The washed membrane is then conditioned in a glycerol-water bath (e.g., at 70/30 by volume), containing formaldehyde (e.g., 100 ppm). The so-obtained asymmetrical membrane generally shows a a thickness of from 15 to 200 $\mu$m and preferably of from 30 to 180 $\mu$m.

Said membrane is enddowed with values of permeability to water, which may generally vary within the range of from 3 to about 9 liters/m2/hour, for a $\Delta$P of 300 mm$_{Hg}$ and with good values of permeability for substances having a molecular weight of up to about 17,000, and that as a function of the conditions under which the same membrane was obtained.

When examined by the electron microscope, the asymmetrical membrane results constituted, in section, by a thick and compact layer, and by a porous layer, with pores having a uniform size and being evenly distributed.

Such an asymmetrical membrane is particularly useful in the dialysis processes, in particular in haemodialysis processes and in ultrafiltration processes in general.

In the following experimental Examples, which are supplied to purely illustrative and not limitative purposes, the membrane is characterized from the viewpoint of its properties of transport of such model substances as: sodium chloride, urea, creatinine, uric acid, vitamin B12, inulin, myoglobin and albumin.

To that purpose, a measurement cell is used, such as that shown in FIG. 1 of the hereto attached drawing table.

More particularly, referring to said figure, the cell consists of two compartments A and B, separated by the membrane M under investigation, positioned between the flanges F. To compartment A, through the inlet pipe E, the solution containing the substance under investigation is fed.

The same solution exits compartment A, through the outlet U, in such a way that inside A a circulation is maintained of the solution containing the substance to be tested, by means of a suitable recycle pump. In compartment B, distilled water is contained, in which the concentration of the substance diffused from A is measured. A mechanical stirrer C stirs the liquid contained in b.

Both compartments A and B are kept at 25° C. by a fluid circulating through the temperature-control jacket T.

EXAMPLE 1

15 parts by weight of polyester-amide (TATE)$_n$ having the following characteristics:

relative viscosity: 2.3;
content of free carboxy groups: 22 meq/kg;
melting point: 255° C.;

is dissolved at 100° C. in a solution consisting of 80 parts by weight of dimethylacetamide and 5 pars by weight of lithium chloride. When the polymer is completely dissolved, the solution is cooled to 80° C. and is used for preparing a flat asymmetrical membrane.

To that purpose, a device is used, which is essentially constituted by a doctor blade with micrometric adjustment, which allows the polymer solution to be spread on glass sheets of about 15 cm $\times$ 15 cm of dimensions.

Immediately after the spreading, the glass sheet is dipped into a coagulation tank, containing 3 liters of water, at room temperature (25° C.). After 3-5 minutes, the glass sheet is removed from the coagulation tank, and the membrane is mechanically separated from the glass sheet and is dipped into a wash tray, wherein it is left, inside running water, for 24 hours.

The washed membrne is then conditioned with a water/glycerin solution (70/30 by volume) containing 100 ppm of formaldehyde.

On the so-obtained asymmetrical membrane, the characteristics are determined, which are reported in following Table 1:

TABLE 1

| Substance | Diffusion Coefficient (cm$^2$/second) |
| --- | --- |
| Sodium Chloride | $3.2 \cdot 10^{-6}$ |
| Urea | $2.9 \cdot 10^{-6}$ |
| Uric acid | $2.0 \cdot 10^{-6}$ |
| Creatinine | $2.5 \cdot 10^{-6}$ |
| Vitamin B12 | $3.2 \cdot 10^{-7}$ |
| Inulin | $2.1 \cdot 10^{-7}$ |
| Myoglobin | 0 |
| Albumin | 0 |

The membrane permeability to water is of 6.8 liters/m2/hour, for a $\Delta$P of 300 mm$_{Hg}$.

The thickness of the membrane is of 180 $\mu$m.

EXAMPLE 2

20 Parts by weight of the polyester-amide of Example 1 is dissolved in a solution constituted by 75 parts by weight of dimethylacetamide and 5 parts by weight of lithium chloride. The co-obtained polymer solution is spread on a glass sheet and coagulated as disclosed in Example 1. On the so-obtained asymmetrical membrane, the characteristics are determined, which are reported in following Table 2.

TABLE 2

| Substance | Diffusion Coefficient (cm$^2$/second) |
| --- | --- |
| Sodium Chloride | $2.5 \cdot 10^{-6}$ |
| Urea | $1.2 \cdot 10^{-6}$ |
| Uric acid | $1.5 \cdot 10^{-6}$ |
| Creatinine | $2.0 \cdot 10^{-6}$ |
| Vitamin B12 | $2.5 \cdot 10^{-7}$ |
| Inulin | $1.4 \cdot 10^{-7}$ |
| Myoglobin | 0 |
| Albumin | 0 |

The membrane permeability to water is of 6 liters/m2/hour, for a $\Delta$P of 300 mm$_{Hg}$.

The thickness of the membrane is of 170 μm.

EXAMPLE 3

25 Parts by weight of the polyester-amide of Example 1 is dissolved in a solution constituted by 70 parts by weight of dimethylacetamide and 5 parts by weight of lithium chloride. On the so-obtained membrane the characteristics are determined, which are reported in following Table 3.

TABLE 3

| Substance | Diffusion Coefficient (cm²/second) |
| --- | --- |
| Sodium Chloride | $1 \cdot 10^{-6}$ |
| Urea | $0.7 \cdot 10^{-6}$ |
| Uric acid | $5 \cdot 10^{-7}$ |
| Creatinine | $1.0 \cdot 10^{-6}$ |
| Vitamin B12 | $6.2 \cdot 10^{-8}$ |
| Inulin | $5.2 \cdot 10^{-8}$ |
| Myoglobin | 0 |
| Albumin | 0 |

The membrane permeability to water is of 3.0 liters/m²/hour, for a ΔP of 300 mm$_{Hg}$.

The thickness of the membrane is of 190 μm.

EXAMPLE 4

15 Parts by weight of the polyester-amide as disclosed in Example 1 is dissolved in a solution constituted by 85 parts by weight of formic acid at a concentration higher than 89%, by operating at the temperature of about 100° C. The obtained solution is filtered on a 500-mesh steel net and is spread on glass sheets, in a similar way to Example 1, by operating with the solution at 98°–100° C.

On the so-obtained membrane the characteristics are determined, which are reported in following Table 4.

TABLE 4

| Substance | Diffusion Coefficient (cm²/second) |
| --- | --- |
| Sodium Chloride | $4.3 \cdot 10^{-6}$ |
| Urea | $4.8 \cdot 10^{-6}$ |
| Uric acid | $5.9 \cdot 10^{-6}$ |
| Creatinine | $7.0 \cdot 10^{-6}$ |
| Vitamin B12 | $8.4 \cdot 10^{-7}$ |
| Inulin | $9.7 \cdot 10^{-7}$ |
| Myoglobin | $3.5 \cdot 10^{-7}$ |
| Albumin | 0 |

The membrane permeability to water is of 8.7 liters/m²/hour, for a ΔP of 300 mm$_{Hg}$.

The thickness of the membrane is of 70 μm.

EXAMPLE 5

20 Parts of weight of the polyester-amide of Example 1 is dissolved in 80 parts by weight of formic acid at a concentration higher than 99%. By operating as disclosed in Example 4, a membrane is obtained, the characteristics of which are reported in following Table 5.

TABLE 5

| Substance | Diffusion Coefficient (cm²/second) |
| --- | --- |
| Sodium Chloride | $3.0 \cdot 10^{-6}$ |
| Urea | $3.4 \cdot 10^{-6}$ |
| Uric acid | $2.7 \cdot 10^{-6}$ |
| Creatinine | $3.5 \cdot 10^{-6}$ |
| Vitamin B12 | $6.5 \cdot 10^{-6}$ |
| Inulin | $5.2 \cdot 10^{-7}$ |
| Myoglobin | $2.4 \cdot 10^{-7}$ |

TABLE 5-continued

| Substance | Diffusion Coefficient (cm²/second) |
| --- | --- |
| Albumin | 0 |

The membrane permeability to water is of 8.0 liters/m²/hour, for a ΔP of 300 mm$_{Hg}$.

The thickness of the membrane is of 70 μm.

EXAMPLE 6

25 Parts by weight of the polyester-amide as disclosed in Example 1 is dissolved in 75 parts by weight of formic acid at a concentration higher than 99%. By operating as disclosed in Example 4, a membrane is obtained, the characteristics of which are reported in following Table 6.

TABLE 6

| Substance | Diffusion Coefficient (cm²/second) |
| --- | --- |
| Sodium Chloride | $2.0 \cdot 10^{-6}$ |
| Urea | $2.2 \cdot 10^{-6}$ |
| Uric acid | $1.8 \cdot 10^{-6}$ |
| Creatinine | $2.0 \cdot 10^{-6}$ |
| Vitamin B12 | $4.2 \cdot 10^{-7}$ |
| Inulin | $3.8 \cdot 10^{-7}$ |
| Myoglobin | $1.7 \cdot 10^{-7}$ |
| Albumin | 0 |

The membrane permeability to water is of 7.0 liters/m²/hour, for a ΔP of 300 mm$_{Hg}$.

The thickness of the membrane is of 70 μm.

We claim:

1. An asymmetrical membrane suitable for dialysis and ultrafiltration comprising: polyester-amide (TATE)$_n$, wherein T represents a radical of terephthalic acid, A represents a radical of hexamethylenediamine, and E represents a radicla of hexanediol, said polyester-amide having a relative viscosity of from 2 to 2.5, a content of free carboxy groups of from 15 to 25 meq/kg, and a melting point of from 252° to 260° C., said membrane displaying a thickness of from 15 to 190 μm, a water permeability of from about 3 up to about 9 liters/m²/hour, for a ΔP of 300 mm$_{Hg}$ and being effectively permeable for substances having a molecular weight of up to about 17,000.

2. The asymmetrical membrane according to claim 1, having a thickness of from 30 to 180 μm.

3. A process for preparing an asymmetrical membrane having permeability for substances of up to a high molecular weight for use in dialysis and ultra-filtration comprising:
 (a) preparing a solution of polyester-amide (TATE)$_n$, wherein T represents a radical of terephthalic acid, A represents a radical of hexamethylenediamine, and E represents a radical of hexanediol, in a solvent comprising formic acid or in a solvent comprising a solution of lithium chloride in dimethylforamide or dimethylacetamide;
 (b) spreading said solution of polyester-amide (TATE)$_n$ on a flat support to form a thin layer;
 (c) dipping said coated support into an aqueous coagulation bath to coagulate said membrane on top of said support; and
 (d) recovering said membrane.

4. The process according to claim 3, wherein said layer of polyester-amide (TATE)$_n$ is from 20 to about 200 μm thick.

5. The process according to claim 3, wherein said solvent comprises formic acid at a concentration higher than about 99%.

6. The process according to claim 3, wherein said polyester-amide has a relative viscosity of from 2 to 2.5, a content of free carboxy groups of from 15 to 25 meq/kg, and a melting point of from 252° to 260° C.

7. The process according to claim 6, wherein said polyester-amide has a relative viscosity of about 2.3, a content of free carboxy groups of about 22 meq/kg, and a melting point of abou 255° C.

8. The process according to claim 3, wherein said solvent is a solution of 2-7 parts by weight of lithium chloride in 100 parats by weight of dimethylformamide or of dimethylacetamide and in said solvent said polyester-amide is dissolved in an amount of from 15 to 35 parts by weight per each 100 parts by weight of solvent.

9. The process according to claim 8, wherein said solvent is a solution of 4–6 parts by weight of lithium chloride in 100 parts by weight of dimethylformamide or of dimethylacetamide.

10. The process according to claim 3, wherein said polyester-amide is dissolved in said formic acid up to an amount of from 15 to 35 parts by weight of said formic acid.

11. The process according to claim 3, wherein the solution of said polyester-amide is spread at a temperataure of from 8° to 100° C.

12. The process according to claim 3, wherein said aqueous coagulation bath is kept at about room temperature and the coagulation time is from 1 to 10 minutes.

13. The process according to claim 12, wherein the coagulation time is from 3 to 5 minutes.

14. An asymmetrical membrane is produced according to the process of claim 3.

15. The membrane according to claim 14 having a thickness of from 30 to 180 $\mu$m.

* * * * *